Aug. 2, 1966  E. J. JEMAL ETAL  3,263,748
CONVEYOR HEAT EXCHANGER
Filed Sept. 30, 1964   3 Sheets-Sheet 1
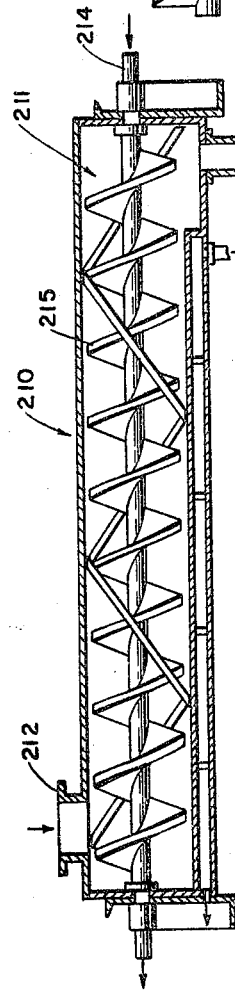
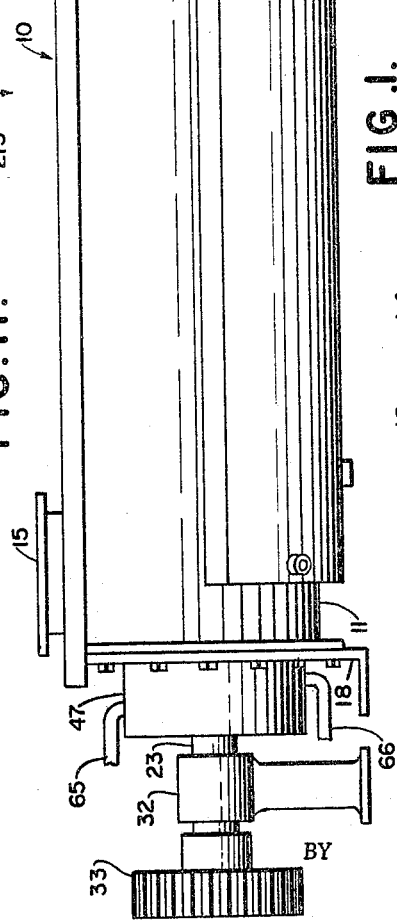
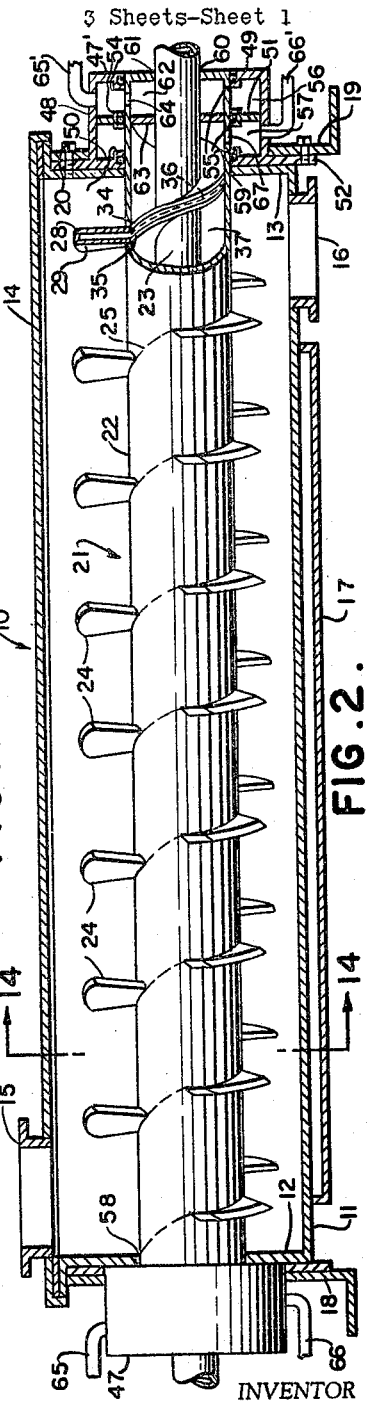
INVENTOR
Emile J. Jemal &
Donald J. Drinkwater
BY Munson H. Lane
ATTORNEY

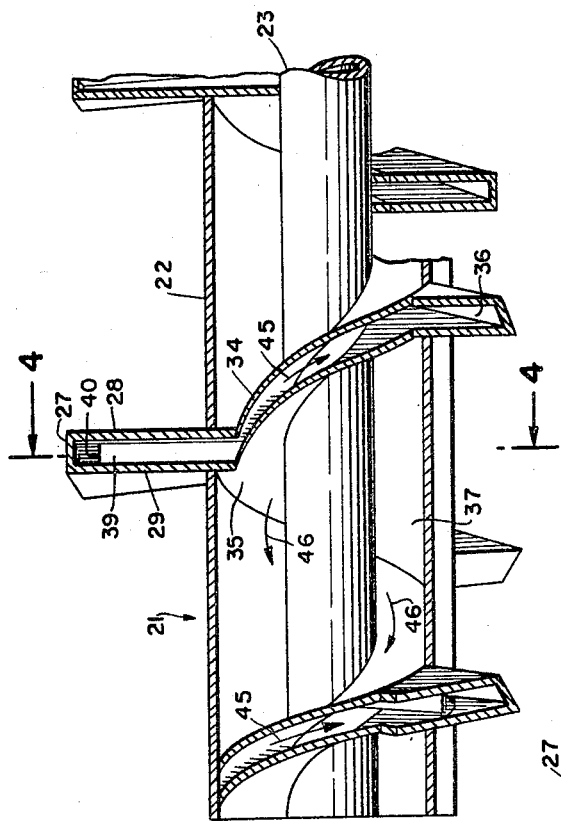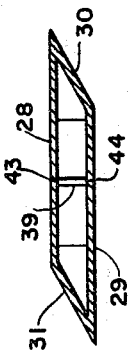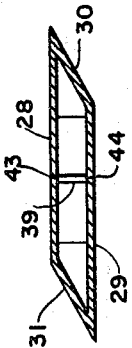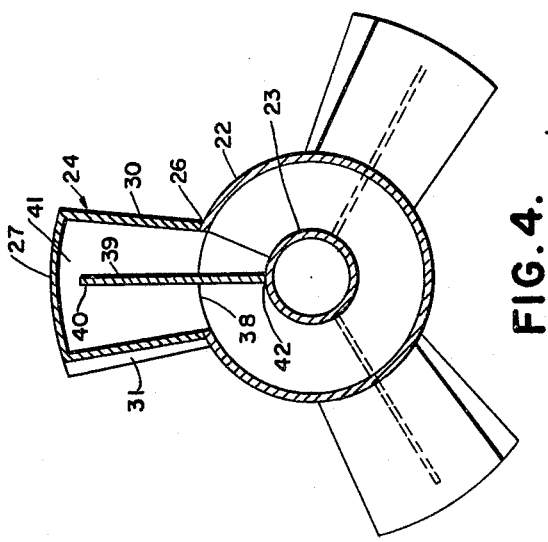

Aug. 2, 1966     E. J. JEMAL ETAL     3,263,748
CONVEYOR HEAT EXCHANGER
Filed Sept. 30, 1964     3 Sheets-Sheet 3

INVENTOR
Emile J. Jemal &
Donald J. Drinkwater

BY  *Munson H. Lane*

ATTORNEY

United States Patent Office 3,263,748
Patented August 2, 1966

3,263,748
CONVEYOR HEAT EXCHANGER
Emile J. Jemal, Yonkers, N.Y., and Donald J. Drinkwater, Denver, Colo., assignors to Mine and Smelter Company, Denver, Colo., a corporation of Colorado
Filed Sept. 30, 1964, Ser. No. 400,501
13 Claims. (Cl. 165—87)

The present invention relates to material handling and treatment apparatus, and particularly to an improved hollow, rotary conveyor heat exchange device adapted to rotate within a material confining receptacle through which loose, granular, and fluid material or the like is conveyed by means of the hollow rotary conveyor, the material being subject to improved heat exchange through the exterior surface of the hollow, rotary conveyor with heat exchange fluid within the confines of the hollow rotary conveyor.

In certain industrial processes solid materials are heated, roasted, or dried as part of their processing, and require subsequently to be cooled. This is particularly true in certain mining and chemical operations where ores require roasting as a step in the separation of their constituents. Such material, after the furnacing, require removal of the heat retained by the material in order to facilitate subsequent steps in their further treatment.

Various types of apparatus have been used for purposes of performing the heat exchange, but the devices of prior art have been limited in their efficiency by reduced surfaces of contact of the conveying mechanism with the material of the cooling medium. Certain prior devices have also been limited in their operating results by lack of provision for the proper stirring action on the hot material (or the cool material if the heat exchanger is being used as a heater of solids), in order to bring it in contact with the surfaces of the container and the conveying cooling mechanism.

The principal object of the present invention is to provide an improved means for the heat exchange of materials with an unusually high degree of efficiency.

Another and more particular object of the invention is to provide in a device of this character means for supplying and regulating the temperature of a heat exchange medium.

A still further object is to provide means for cooling combustible solids in confined receptacles on a continuous basis so as to prevent chemical damage to the material until it has reached a safe cool temperature. Examples of these materials are activated carbon, charcoal, and other carbonaceous materials.

It is a further and particular object of this invention to provide a hollow rotary conveyor and heat exchange device comprising an outer hollow shaft having baffled hollow paddles spaced circumferentially and longitudinally about the exterior surface of the outer hollow shaft, an inner hollow shaft mounted coaxially within the outer hollow shaft, and a pair of spaced helicoid wall members mounted between the inner and outer shafts and forming a pair of noncommunicating, parallel helical passages for separate heat exchange fluids, one of the helical passages being in fluid communication with the interior of the baffled hollow passage through slots in the wall of the outer hollow shaft and adapted to supply a first circulating heat exchange fluid to the interior of the hollow paddles, the second fluid passage being confined within the inner and outer hollow shafts and adapted to guide a second heat exchange fluid in heat exchange relationship with said first heat exchange fluid to regulate the temperature thereof by indirect heat exchange through said helicoid wall members.

Another object of this invention is to provide a hollow conveyor heat exchange element having two non-communicating passages within the element for circulation of primary and secondary heat exchange fluids in indirect heat exchange relationship with each other.

With the foregoing objects and features in view and such other objects and features as may become apparent as this specification proceeds, the invention will be understood from the following description taken in conjunction with the accompanying drawings wherein like characters of reference are used to designate like parts, and wherein:

FIG. 1 is a side elevational view showing one embodiment of the invention;

FIG. 2 is a side elevation in section of the embodiment shown in FIG. 1 with a partial sectional view of one end of the rotary heat exchange conveyor element;

FIG. 3 is a longitudinal section of a portion of the rotary heat exchanger conveyor element;

FIG. 4 is a cross sectional view taken on line 4—4 of FIG. 3;

FIG. 5 is an elevational view of one of the hollow baffled paddles in accordance with the invention;

FIG. 6 is a sectional view taken on line 6—6 of FIG. 5;

FIG. 17 is a longitudinal section of a prior art device showing a heat exchanger conveyor screw mounted within a trough; and FIG. 18 is a side elevation of a second prior art conveyor screw.

Figure 7:
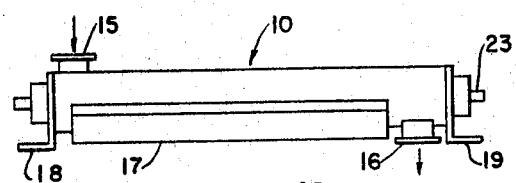
FIG. 7 is a side elevational view showing one embodiment of the invention in use as a single unit.

Referring to FIGS. 1 and 2, one form of the invention is illustrated as having a housing generally indicated at 10 and including an elongated trough-shaped body 11, opposite end walls 12, 13, a cover 14, a material inlet conduit 15, a material outlet conduit 16 and a spaced jacket 17 coextensive with a portion of the trough-shaped body. The housing 10 is supported by mounting brackets 18 and 19 suitably attached to opposite end walls 12 and 13, respectively, by means of bolts 20 or other fasteners.

The hollow rotary conveyor heat exchanger element of this invention generally indicated at 21 is rotatably mounted within the housing 10 and is adapted to convey materials entering the housing at 15 through the housing and discharge them at 16 while causing heat exchange between the materials and heat exchange fluids circulating within the rotary conveyor heat exchange element.

The conveyor heat exchange element 21 (shown in detail in FIGS. 2–6 and 14) includes an outer hollow shaft 22, an inner hollow shaft 23, and hollow paddles 24. The hollow paddles 24 are generally shaped as arcuate sectors of a screw thread. They extend radially outwardly from the exterior surface of the outer shaft 22 and are equally spaced both circumferentially and longitudinally about the surface of the hollow shaft, as if they were sectors cut from an imaginary hollow screw thread wound about the outer shaft along a helical path indicated by the dotted line 25. As seen particularly in FIG. 5 the paddles 24 include an open arcuate base 26 conforming to the curvature of the outer shaft 22, an arcuate outer wall 27, spaced forward and rear walls 28 and 29 (designated with respect to the direction of material flow from inlet 15 to outlet 16) and spaced leading and trailing end walls 30, 31 (designated with respect to the direction of rotation of the paddles in effecting the aforesaid direction of material flow). The base edges of the paddle walls 28, 29, 30 and 31 may be secured to the exterior surface of the outer shaft 22 by welding or other suitable means.

The inner shaft 23 is mounted coaxially within the outer shaft 22. The ends of the inner shaft 23 preferably extend beyond the ends of the outer shaft 22 (as seen in FIGS. 1 and 2) to provide bearing surfaces for external support of the rotary conveyor heat exchanger element 21 within bearing blocks 32 (only one being shown in FIG. 1) and to provide means for driving the element 21 through a gear 33 or other suitable drive means attached to the shaft 23.

A pair of spaced parallel, helicoid wall members 34, 35 are secured between the inner wall surface of outer shaft 22 and the exterior wall surface of inner shaft 23 by welding or other suitable means to form a pair of non-communicating helical passages 36, 37, respectively, for confining separate heat exchange fluids. The helicoid wall members 34, 35 are axially spaced on opposite sides of the helical path 25, so that if the walls 28 and 29 were extended through the wall of the outer shaft 22 they would meet the outer edges of the helicoid walls 34 and 35, respectively, along their line of attachment. Openings 38 are provided in the wall of the outer shaft 22 at the base of the paddles 24 which are generally coextensive with the open base 26. An elongated baffle 39 is mounted within each of the paddles 24 and is secured to the forward and rear walls 28 and 29 along radial lines extending medially through said walls. The outer end 40 of each of the baffles terminates within the respective paddle short of the outer arcuate wall 27 so as to provide an opening 41 to permit fluid circulation within the paddles. The inner end 42 of each of the baffles extends through a respective one of the openings 38 and terminates against the outer surface of the inner shaft 23 and is secured thereto by welding. Side edges 43 and 44 of the inner end of each baffle are secured to facing surfaces of the helicoid walls 34, 35 respectively to provide transverse radial barriers within the helical passage 36.

It will be apparent that fluid circulating through helical passage 36 on reaching a baffle 39 will be forced to flow radially outwardly through an opening 38 into paddle 24 along one face of the baffle 39, through the opening 41 and inwardly along the other face of the baffle 39 back into the helical passage 36. By means of the baffles 39 a primary heat exchange fluid within helical passage 36 is forced into contact with the walls of paddles 24 for efficient transfer of heat between the primary heat exchange fluid and material being agitated and conveyed by the paddles 24. The helical passage 36 circulates the primary heat exchange fluid through the paddles in a series arrangement. Unlike the hollow helicoid screws of prior art devices such as shown in FIG. 17, this invention, by the use of paddles, prevents compacting of the moving material by the agitation and mixing action of the paddles 24 while at the same time exposing a large area of cooling surface to the material.

The pitch of the helicoid walls 34 and 35 can be varied depending on the number of paddles and other requirements. The spacing of the two helicoid walls 34 and 35 can also be varied, thus giving complete flexibility. The pitch of the paddles can also be adjusted to a given pattern for maximum mixing action.

The second helical passage 37 formed by the faces of helicoid wall members 34 and 35 opposite from the faces forming helical passage 36 is adapted to guide a secondary or control heat transfer fluid between the inner surface of outer shaft 22 and the outer surface of inner shaft 23. Fluid flowing in the helical passage 37 passes in heat exchange relationship with the primary heat exchange fluid in helical passage 36 and provides a means for regulating the temperature of the primary heat exchange fluid by indirect heat exchange through the helicoid wall members 34 and 35. The flow of primary heat exchange fluid in passage 36 is preferably counter to the direction of flow of the secondary heat exchange fluid in passage 37, as indicated by the arrows 45 and 46, respectively, in FIG. 3.

Similar double fluid headers 47, 47' are provided at opposite ends of housing 10 to permit rotation of the conveyor heat exchanger element 21 while supplying and withdrawing primary and secondary heat exchange fluids to and from the helical passages 36 and 37. The headers can be of various forms, the primary requirement being, as aforesaid, that they permit rotation of the conveyor heat exchanger element 21 while supplying and withdrawing primary and secondary heat exchange fluids to and from the helical passages 36 and 37 without leakage.

The header 47' (as shown in section at the right in FIG. 2) comprises a cylindrical body 48, an outer end ring 49, an inner end ring 50, a center partition ring 51, and a radially outwardly extending annular flange 52 projecting from the inner end of cylindrical body 48. The flange 52 is clamped between the support bracket 19 and the end wall 13 to secure the header 47' against the housing 10. The radially inner circular edges of outer end ring 49, inner end ring 50, and partition ring 51 are each provided with annular grooves 54 in which are seated suitable packing rings 55 which are adapted to bear against the outer surface of the outer shaft 22 so as to provide two independent fluid chambers 56, 57 surrounding the outer shaft 22. The opposite ends of the outer shaft 22 extend through apertures 58, 59 in housing end plates 12 and 13 and through headers 47, 47'.

The opposite ends of the hollow outer shaft 22 are closed by circular end plates 60 which have circular central apertures 61 through which extend opposite ends of the inner shaft 23. As mentioned heretofore, the opposite ends of the inner shaft 23 extend beyond the ends of the outer shaft 22 and are supported by external bearing blocks. The left hand bearing block is designated at 32 in FIG. 1. It is to be understood that a similar bearing block supports the opposite end of inner shaft 23, but for convenience has not been shown.

The helical passage 36 communicates with fluid chambers 62 (only one being shown) formed at the opposite ends of the outer shaft 22 between the circular end plates 60 and transverse partitions 63 through slots formed in the transverse partitions at the terminous of the helicoid walls 34, 35. The transverse partitions 63 are secured by welding or other suitable means to the inner surface of the outer shaft 22, to the outer surface of the inner shaft 23, and to the ends of the helicoid walls 34 and 35. They are spaced inwardly from the end walls 60, thereby forming the fluid chambers 62. The chambers 62 communicate with outer header chambers 56 through apertures 64 in the outer shaft 22 for the inflow and outflow of primary heat exchange fluid.

Primary heat exchange fluid is fed to the header 47 via inlet conduit 65 and is withdrawn from the header 47' via outlet conduit 65'.

The primary heat exchange fluid therefore enters the left end fluid chamber of fluid header 47 corresponding to right hand outer header chamber 56 via fluid inlet conduit 65. It then flows into a left hand fluid chamber (not shown but corresponding to right hand chamber 62) through an aperture similar to aperture 64 in the outer shaft 22. From there it enters the helical passage 36 and flows in the direction shown by the arrow 45 (FIG. 3) toward the right hand end. Primary fluid exits from the helical passage 36 at the right hand end through a slot in the transverse partition 63 into the right hand fluid chamber 62, and then through the aperture 64 into the outer header chamber 56, from which it is withdrawn by way of outlet conduit 65'.

The secondary heat exchange fluid is fed into the inner header chamber 57 at the right hand end of the housing 10 via secondary fluid conduit 66'. Apertures 66 (one at the right hand end being shown, there being a similar aperture at the left hand end) through the outer shaft 22 provide fluid communication between the inner fluid header chambers 57 and the helical passage 37. The secondary heat exchange fluid thus flows from the right hand inner header chamber 57 into the helical passage 37, through the helical passage 37 in the direction indicated by the arrow 46 (shown in FIG. 3), and out of helical passage 37 into an inner header chamber (not shown, but corresponding to right hand header chamber 57) at the left hand end within header 47 and out through secondary fluid exhaust conduit 66.

It is to be understood that while preferred directions of flow of primary and secondary heat exchange fluids have been indicated and described, the invention is not limited by these directions of flow and the fluid can be directed opposite from the directions described, depending upon the heat exchange requirements.

If the material to be treated by this invention is a hot granular solid product from a roasting furnace or the like it will often be necessary to remove heat retained by the material in order to facilitate subsequent steps in the treatment of the material. In accordance with a preferred arrangement of this invention the material is fed into housing 10 through the material inlet conduit 15. Within the housing 10 the material is mixed by the paddles 24 and is forced toward the discharge conduit 16, from which it is passed into a suitable receptacle or conveyor (not shown). In order to cool the material within the housing 10 a primary cooling fluid is directed through the helical passage 36 and serially through the paddles 24 from left to right in a manner previously described corresponding to the direction of flow of the hot material. Heat exchange between the primary cooling fluid and the hot material takes place through the walls of the paddles 24 and also through the helical portion of the outer shaft 22 covering the helical passage 36.

The temperature of the primary cooling fluid is regulated by means of a secondary cooling fluid which is passed from right to left through the helical passage 37. Heat exchange between the secondary cooling fluid and the primary cooling fluid takes place through the helicoid walls 34, 35. The rate of secondary fluid flow and the temperature of the secondary fluid can be controlled by external means (not shown) in order to regulate the temperature of the primary cooling fluid within predetermined limits.

If the material is to be heated then the primary heat exchange fluid will be heated, and its temperature will be regulated by means of the secondary heat exchange fluid within predetermined limits.

It is to be noted that there is some heat exchange between the secondary heat exchange fluid and the material within the housing 10, through the portion of the outer shaft 22 covering the helical passage 37.

Where the materials to be treated within the housing 10 are corrosive the portions of the conveyor heat exchange element 21 exposed to contact with the corrosive materials are preferably made from non-corrosive metals such as stainless steel. The portions of the heat exchange element 21 not exposed to the corrosive material, such as the inner shaft 23, the helicoid walls 34, 35, and the baffles 39, can be made of less expensive carbon steel or the like. Since the entire conveyor heat exchange element 21 does not have to be made of relatively expensive stainless steel or similar non-corrosive metal it is apparent that the conveyor heat exchange element of this invention can be produced at much less cost per unit of heat transfer obtained than can other heat exchange conveyors, such as the screw conveyors shown in FIGS. 17 and 18, which would require the use of a greater amount of non-corrosive metals in manufacture.

Figure 8:
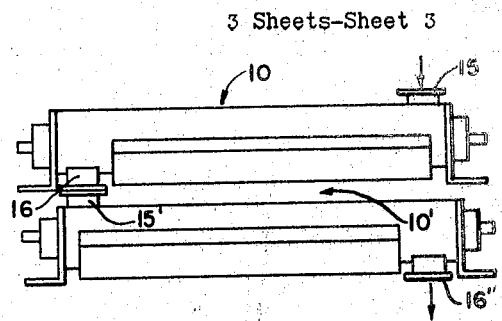
FIG. 8 is a side elevational view showing two units of the invention connected in series.
Figure 9:
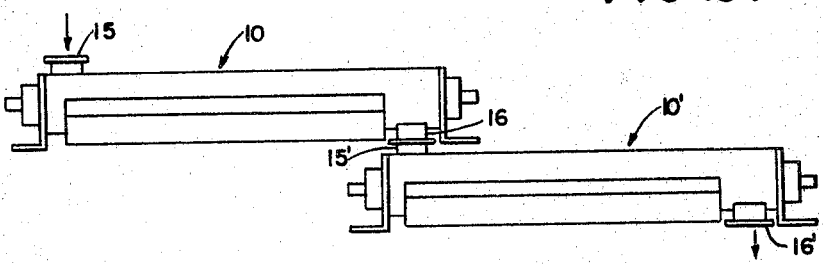
FIG. 9 is a side elevational view showing an alternate arrangement of two units of the invention connected in series.

FIGS. 8 and 9 are provided to illustrate various ways of connecting the single unit shown in FIGS. 1–7 in multiple. Both FIGS. 8 and 9 show similar units 10, 10' connected for series flow. The material discharge conduit 16 of one unit is connected to the material inlet coonduit 15' of the second unit. Material from the second unit 10' is discharged from the conduit 16'. In FIG. 8 two units are placed one above the other, while in FIG. 9 one unit is placed above and to one side of the other. Multiple combinations of units in any desired number can be used within the scope of this invention.

Figure 10:
FIG. 10 is an end view of the invention incorporating one heat exchange flight within a housing.
Figure 11:
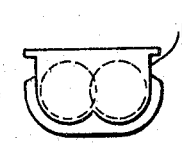
FIG. 11 is an end view of the invention incorporating two heat exchanger flights within a housing.
Figure 12:
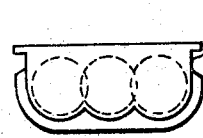
FIG. 12 is an end view of the invention incorporating three heat exchanger flights within a housing.
Figure 13:
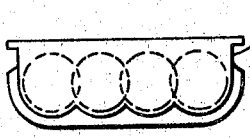
FIG. 13 is an end view of the invention incorporating four heat exchanger flights within a housing.

FIGS. 10–13 are provided to illustrate conveyor heat exchanger housings adapted to house one or more conveyor heat exchange elements. FIG. 10 shows a housing 10 adapted to house a single conveyor heat exchange element, while FIGS. 11, 12 and 13 show housing 100, 100', 100'' adapted to house two, three and four conveyor heat exchange elements, respectively.

Figure 14:
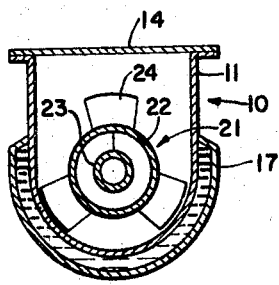
FIG. 14 is a transverse sectional view taken on line 14—14 of FIG. 2.
Figure 15:
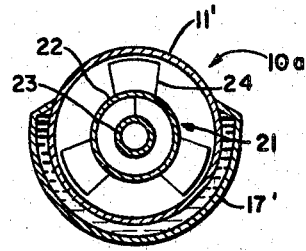
FIG. 15 is a transverse sectional view of another embodiment of the invention.
Figure 16:
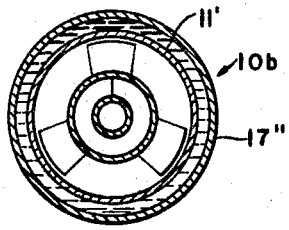
FIG. 16 is a transverse sectional view of still another embodiment of the invention.

FIG. 14 is a sectional view taken on line 14—14 of FIG. 2, and FIGS. 15 and 16 are similar sectional views of modified embodiments which illustrate several of the various forms the conveyor heat exchanger housing may have within the scope of this invention for different purposes.

As shown in FIG. 14, the housing 10 has a U-shaped trough body 11 and a U-shaped fluid jacket 17 surrounding the bottom portion of the trough. A cover 14 closes the top of the U-shaped trough. The conveyor heat exchange element 21 previously described is mounted in the bottom portion of the trough 11 so that the arcuate ends of the paddles 24 as they turn in the arcuate bend of the trough generate an arc that is parallel to the arcuate bend of the trough, but is radially inwardly spaced therefrom.

As shown in FIG. 15 the housing 10a has a cylindrical body 11' which surrounds the conveyor heat exchanger element 21. The cylindrical body 11' is concentric with the inner and outer shafts 23 and 22 of the conveyor heat exchanger element 21. The fluid jacket 17' is generally similar to the fluid jacket 17 shown in FIG. 14.

FIG. 16 shows a housing 10b having a cylindrical body 11' similar to the embodiment shown in FIG. 15. The embodiment shown in FIG. 16, however, has a cylindrical fluid jacket 17'' completely surrounding the cylindrical body 11'. The shape of the housing and the fluid jacket may be selected according to the requirements of the particular material being handled. If the troughs are only partially filled with material the troughs shown in FIGS. 14 and 15 would preferably be used since the fluid jackets only partially surround the troughs 11, 11'. If the trough is to be filled with material then the embodiment shown in FIG. 16 would preferably be used because the fluid jacket 17'' completely surrounds the trough 11' and provides heat exchange between fluid filling the fluid jacket cavity and the material filling the trough 11'.

FIGS. 17 and 18 illustrate two forms of prior art material handling devices.

The conveyor heat exchanger shown in FIG. 17 comprises a hollow helical screw conveyor heat exchanger element 211 mounted within a housing 210. Material to be treated enters the housing 210 via inlet conduit 212, and is forced toward the discharge conduit 213 by means of the conveyor heat exchanger element 211.

The conveyor heat exchanger element 211 comprises a hollow shaft 214 extending through opposite ends of the housing 210, and a hollow helical screw flight or fin 215 wrapped around the shaft and secured thereto. Fluid passages (not shown) are provided between the hollow shaft 214 and the hollow fin 215 so that fluid entering the right hand end of hollow shaft 214 circulates in a helical path through the helical fin 215 and is discharged through the opposite end of the hollow shaft 214. Heat exchange takes place between the heat exchange fluid within the fin 215 and the material in housing 215 through the walls of the hollow fin 215.

The conveyor heat exchanger element 211 shown in FIG. 17 does not provide the mixing and agitating action provided by the paddle 24 of this invention. Nor does it provide a secondary fluid heat exchange means to regulate the temperature of a primary heat exchange fluid as is provided by secondary fluid flow in helical passage 37 of this invention.

FIG. 18 illustrates a prior art screw conveyor element 220 wherein paddles 221 are mounted on the screw conveyor shaft 222 to provide increased mixing action over that provided by the screw conveyor heat exchanger element 211 shown in FIG. 17. While mixing action is provided by the paddle 221 or conveyor element 220, it will be apparent that the cost of the unit 220, having both paddles and screw fin, would be relatively great compared to the cost of the conveyor heat exchanger element 21 of this invention because the area of exterior surface of the unit 220 required to be made of expensive non-corrosive metal is much greater than the area of exterior surface of the unit 21 of this invention.

While in the foregoing description there have been described and shown the preferred embodiments of the invention, various modifications may become apparent to those skilled in the art to which the invention relates. Accordingly, it is not desired to limit the invention to the disclosure, and various modifications and equivalents may be resorted to falling within the spirit and scope of the invention as claimed.

We claim:

1. A hollow, rotary conveyor heat exchanger device comprising a shaft assembly including an outer hollow shaft, and an inner shaft mounted coaxially within said outer hollow shaft, hollow paddles radially mounted on the exterior surface of said outer hollow shaft and spaced circumferentially and longitudinally about the surface of said hollow shaft along a helical path starting at one end of the shaft and ending at the other end of the shaft, said paddles having an open arcuate base secured to said outer shaft, a pair of spaced helicoid wall members mounted between said inner and outer shafts and forming a pair of noncommunicating parallel helical passages for separate heat exchange fluids, said pair of spaced helicoid wall members being axially spaced on opposite sides of said helical path, openings through the wall of said outer shaft at the base of each of said hollow paddles, one of the helical passages formed between said helicoid wall members having communication with said hollow paddles through said openings, an elongated baffle mounted within each of said hollow paddles having one end extending through the opening at the base of the respective paddles into said one of the helical passages to cause a first heat exchange fluid circulating through said one of the helical passages to circulate also through the hollow paddles, the second helical passage formed by said helicoid wall members between said inner and outer hollow shafts being adapted to guide a second heat exchange fluid in heat exchange relationship with said first heat exchange fluid to regulate the temperature of said first heat exchange fluid by indirect heat exchange through said helicoid wall members, said hollow paddles being set at a selected angle with respect to a plane perpendicular to the axis of said outer shaft so that said paddles exert a longitudinal thrust on material contacted thereby when said conveyor heat exchanger is rotated.

2. A material handling and heat exchange device comprising a conveyor housing including an enclosed elongated trough body, a pair of end walls closing the ends of said trough body, a material inlet conduit near one end of said body, a material outlet conduit near the other end of said body, a heat exchange fluid jacket spaced from said body and surmounted over at least a portion thereof providing a hollow passage for a heat exchange fluid to flow in heat exchange relationship with material confined within said housing, heat exchange fluid inlet and outlet conduits in communication with said hollow passage, a hollow rotary conveyor heat exchanger element mounted within said housing for conveying material through said housing while simultaneously causing heat exchange between the material and heat exchange fluid within said element, said element including an outer hollow shaft, and an inner shaft mounted coaxially within said outer hollow shaft, hollow paddles radially mounted on the exterior surface of said outer hollow shaft and spaced circumferentially and longitudinally about the surface of said hollow shaft along a helical path starting at one end of the shaft and ending at the other end of the shaft, said paddles having an open arcuate base secured to said shaft, a pair of spaced helicoid wall members mounted between said inner and outer shafts and forming a pair of noncommunicating parallel helical passages for separate heat exchange fluids, said pair of spaced helicoid wall members being axially spaced on opposite sides of said helical path, openings through the wall of said outer shaft at the base of each of said hollow paddles, one of the helical passages formed between said helicoid wall members having communication with said hollow paddles through said openings, an elongated baffle mounted within each of said hollow paddles having one end extending through the opening at the base of the respective paddles into said one of the helical passages to cause a first heat exchange fluid circulating through said one of the helical passages to circulate also through the hollow paddles, the second helical passage formed by said helicoid wall members between said inner and outer hollow shafts being adapted to guide a second heat exchange fluid in heat exchange relationship with said first heat exchange fluid to regulate the temperature of said first heat exchange fluid by indirect heat exchange through said helicoid wall members, said hollow paddles being set at an angle with respect to a plane perpendicular to the axis of said outer shaft so that said paddles exert a longitudinal thrust on material contacted thereby when said conveyor heat exchange is rotated, and means rotatably supporting the ends of said shaft assembly.

3. The apparatus set forth in claim 2 wherein said enclosed elongated trough body is U-shaped in cross section.

4. The apparatus set forth in claim 2 wherein said enclosed elongated trough body is cylindrical.

5. The apparatus set forth in claim 4 wherein said heat exchange fluid jacket is cylindrical and concentrically surrounds said elongated trough body throughout a substantial portion of the total length thereof.

6. A hollow rotary conveyor heat exchanger device comprising an outer hollow shaft, an inner shaft mounted concentrically within said outer hollow shaft, thereby forming a cavity between said shafts, a plurality of hollow paddles radially mounted on the exterior surface of said outer hollow shaft and spaced circumferentially and longitudinally about the surface of said outer hollow shaft along a helical path, means between said outer and inner shafts dividing said cavity into a pair of noncommunicating helical fluid passages, one of said helical passages following along said helical path, openings through the wall of said outer shaft providing fluid communication between said one of said helical passages and each of said paddles, means within said one of said helical passages for causing a primary heat exchange fluid flowing in said one of said helical passages to circulate through each of said paddles, means for conducting primary heat exchange fluid to one end of said one of said helical passages and removing the same from the other end thereof, means for conducting a secondary heat exchange fluid to and from the opposite ends of the other of said pair of helical passages and causing said secondary heat exchange fluid to flow in indirect heat exchange relationship with the primary heat exchange fluids in order to regulate the temperature of said primary heat exchange fluid.

7. The device as set forth in claim 6 wherein said paddles are set at a selected angle with respect to a plane perpendicular to the axis of said outer shaft so that said paddles exert a longitudinal thrust on material contacted thereby when said conveyor heat exchanger device is rotated.

8. The device set forth in claim 7 wherein said hollow paddles are generally shaped as arcuate sectors of a hollow screw thread, each paddle including an outer arcuate end wall, outwardly diverging leading and trailing side walls, substantially parallel forward and rear side walls, and an open arcuate base conforming to the curvature of said outer shafts' exterior surface.

9. The device as set forth in claim 6 wherein said means between said outer and inner shafts dividing said cavity into a pair of noncommunicating fluid passages comprises a pair of spaced parallel helicoid wall members.

10. The device as set forth in claim 6 wherein said means within said one of said helical passages for causing a primary heat exchange fluid flowing in said one of said helical passages to circulate through each of said paddles includes an elongated baffle mounted medially within each of said hollow paddles having one end extending through the opening beneath the respective paddles into said one of the helical passages and terminating against said inner shaft.

11. The apparatus set forth in claim 6 wherein the primary and secondary heat exchange fluids are caused to flow in opposite directions through said helical passages.

12. The apparatus set forth in claim 6 wherein the outer shaft and plurality of hollow paddles are made of non-corrosive metal whereas said inner shaft and other parts enclosed between said inner and outer shafts are made from less corrosive resistant metal.

13. The apparatus set forth in claim 12 wherein said non-corrosive metal is stainless steel and said less corrosion resistant metal is a carbon steel.

References Cited by the Examiner

UNITED STATES PATENTS

| | | | |
|---|---|---|---|
| 1,132,421 | 3/1915 | Anderson | 165—120 X |
| 1,701,103 | 2/1929 | Egy | 165—120 X |
| 2,721,806 | 10/1955 | Oberg et al. | 165—87 X |
| 2,899,176 | 8/1959 | Francis et al. | 165—87 |
| 3,020,025 | 2/1962 | O'Mara | 165—87 |

ROBERT A. O'LEARY, *Primary Examiner.*

M. A. ANTONAKAS, *Assistant Examiner.*